US009032992B2

(12) United States Patent
Andersson

(10) Patent No.: US 9,032,992 B2
(45) Date of Patent: May 19, 2015

(54) CHECK VALVE

(75) Inventor: Allan Bo Andersson, Cambridge, NY (US)

(73) Assignee: FLOMATIC CORPORATION, Glens Falls, NY (US)

( * ) Notice: Subject to any disclaimer, the term of this patent is extended or adjusted under 35 U.S.C. 154(b) by 358 days.

(21) Appl. No.: 13/272,783

(22) Filed: Oct. 13, 2011

(65) Prior Publication Data

US 2013/0092864 A1 Apr. 18, 2013

(51) Int. Cl.
*F16K 15/00* (2006.01)
*F16K 25/00* (2006.01)
*F16K 15/06* (2006.01)

(52) U.S. Cl.
CPC ............. *F16K 25/005* (2013.01); *F16K 15/063* (2013.01)

(58) Field of Classification Search
CPC ............. F16K 1/36; F16K 1/44; F16K 1/443; F16K 1/46; F16K 15/028; F16K 15/063
USPC ............. 137/535, 540, 542, 543.13, 543, 137/516.27, 516.29; 251/337, 356, 357, 251/332

See application file for complete search history.

(56) References Cited

U.S. PATENT DOCUMENTS

| | | | | |
|---|---|---|---|---|
| 1,125,342 A | * | 1/1915 | King ............................. 417/191 |
| 1,297,312 A | * | 3/1919 | Barker ...................... 137/543.13 |
| 1,530,924 A | * | 3/1925 | Biedermann ............. 137/533.25 |
| 1,608,424 A | * | 11/1926 | Putnam .................... 137/543.13 |
| 1,860,004 A | * | 5/1932 | Yardley .................... 137/543.13 |
| 1,934,314 A | * | 11/1933 | Lawier ............................. 251/86 |
| 2,163,472 A | * | 6/1939 | Shimer ..................... 137/516.29 |
| 2,594,641 A | * | 4/1952 | Griffith et al. ................ 137/543 |
| 2,610,021 A | * | 9/1952 | Smith ............................ 251/332 |
| 2,672,882 A | | 3/1954 | Bergquist |
| 2,678,187 A | * | 5/1954 | Peters ........................... 251/357 |
| 2,880,750 A | * | 4/1959 | Amison, Jr. ................... 137/469 |
| 3,029,835 A | * | 4/1962 | Biello et al. ................ 137/515.5 |
| 3,057,372 A | * | 10/1962 | Sutton et al. ............. 137/516.29 |
| 3,191,617 A | * | 6/1965 | Maddox .................... 137/516.29 |
| 3,540,472 A | * | 11/1970 | Brady et al. ............. 137/516.29 |
| 3,844,310 A | * | 10/1974 | Brindisi ........................ 137/557 |
| 4,108,204 A | * | 8/1978 | Day ........................... 137/543.13 |
| 4,129,144 A | * | 12/1978 | Andersson et al. ........... 137/541 |
| 4,180,097 A | * | 12/1979 | Sjoberg .................... 137/516.29 |

(Continued)

FOREIGN PATENT DOCUMENTS

CA 994205 8/1976

*Primary Examiner* — Kevin Murphy
*Assistant Examiner* — R. K. Arundale
(74) *Attorney, Agent, or Firm* — Heslin Rothenberg Farley & Mesiti P.C.

(57) ABSTRACT

A check valve is provided which may be installed horizontally or in other non-vertical orientations, and used with variable frequency drives and other applications without the valve disk becoming misaligned. In one aspect, the valve provides a housing with an inner surface and a passage, a flange within the housing which divides the housing into upstream and downstream portions, and extending around the inner surface, defining a valve seat and a valve aperture, a poppet positioned in the downstream portion, including a valve disk and a valve stem extending from the valve disk, the valve disk engaging the valve seat, being moveable, and being resiliently biased in the closed position against the valve seat to inhibit fluid flow in a first direction, and a guide removably mounted on the inner surface of the housing, the guide receiving the valve stem of the poppet valve as the poppet valve moves.

20 Claims, 3 Drawing Sheets

(56) References Cited

U.S. PATENT DOCUMENTS

| | | | |
|---|---|---|---|
| 4,185,656 A | 1/1980 | Braukmann | |
| 4,232,704 A * | 11/1980 | Becker et al. | 137/218 |
| 4,453,561 A * | 6/1984 | Sands | 137/327 |
| 4,535,808 A * | 8/1985 | Johanson et al. | 137/543 |
| 5,971,016 A * | 10/1999 | Wass et al. | 137/541 |
| 6,581,633 B2 * | 6/2003 | Andersson | 137/541 |
| 8,317,498 B2 * | 11/2012 | Gambier et al. | 417/454 |
| 2007/0107785 A9 | 5/2007 | Talaski | |
| 2007/0193633 A1 * | 8/2007 | Howell et al. | 137/542 |
| 2009/0324437 A1 * | 12/2009 | Kuny | 417/559 |

* cited by examiner

CHECK VALVE

TECHNICAL FIELD

This invention relates generally to the field of valves, and more specifically, to valves capable of tolerating a variable flow of fluid.

BACKGROUND OF THE INVENTION

Check valves are designed to permit the flow of fluid in one direction while preventing the fluid from flowing in the reverse direction. Conventional check valves utilize a single poppet valve within a body which controls the flow of fluid therethrough. However, conventional poppet valves are likely to become lodged in the interior seat provided by an annular flange within the valve body. When this happens, it is almost impossible to dislodge the poppet valve without dismantling the check valve or utilizing a new fitting. Moreover, conventional valves are difficult to assemble and may include many parts and fasteners. It may also be awkward to assemble and/or repair valves, as different parts can be located on opposite sides of a valve seat or flange formed within the valves.

SUMMARY OF THE INVENTION

The shortcomings of the prior art may be alleviated by using a valve in accordance with one or more principles of the present invention. The valve of the present invention may be used in any type of hydraulic or other fluid flow lines such as, for example, water, fuel, or gas lines, wells, cisterns, submersible pump applications, pumping outfits or the like. Additionally, other uses may be made of the invention that fall within the scope of the claimed invention but which are not specifically described below.

In one aspect of the invention, there is provided a valve including a housing, the housing including an inner periphery surface defining a passage through the housing between an inlet port and an outlet port, a flange within the housing dividing the passage between the inlet port and outlet port into an upstream portion and a downstream portion, the flange extending circumferentially around the inner periphery surface of the housing, the flange defining a valve seat and having an inner surface defining a valve aperture, a poppet valve positioned in the downstream portion of the passage of the housing, the poppet valve including a valve disk and a valve stem, the valve stem extending from the valve disk towards the outlet port of the housing, the valve disk configured to engage the valve seat of the flange and movable between a closed position and a fully open position, the valve disk being resiliently biased in the closed position against the valve seat to inhibit fluid flow in a first direction and to allow fluid flow in an opposite direction to the first direction, and a guide removably mounted on the inner periphery surface of the housing, the guide receiving the valve stem of the poppet valve as the valve moves between the closed position and the fully open position.

In another aspect of the invention, there is provided a valve including a housing with an inner periphery surface defining a passage through the housing, a flange within the housing dividing the passage into an upstream portion and a downstream portion, the flange defining a valve seat and having an inner surface defining a valve aperture, a poppet valve positioned in the downstream portion of the passage of the housing, the poppet valve including a valve disk and a valve stem, the valve stem extending from the valve disk towards the downstream portion of the passage, the valve disk engaging the valve seat of the flange and moveable between a closed position and a fully open position, the valve disk being resiliently biased on the closed position against the valve seat to inhibit fluid flow in a first direction and to allow fluid flow in an opposite direction to the first direction, and a guide, where the guide includes a sleeve which engages the valve stem of the poppet valve as the poppet valve moves between the closed position and the fully open position, the guide also including support arms extending radially from the sleeve, the support arms mounted to the inner periphery surface of the housing.

Additional features and benefits will become apparent from the following drawings and descriptions of the invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the end of the specification. The foregoing and other objects, features, and advantages of the invention are apparent from the following detailed description taken in conjunction with the accompanying drawings in which:

DETAILED DESCRIPTION OF EMBODIMENTS OF THE INVENTION

Figure 1:
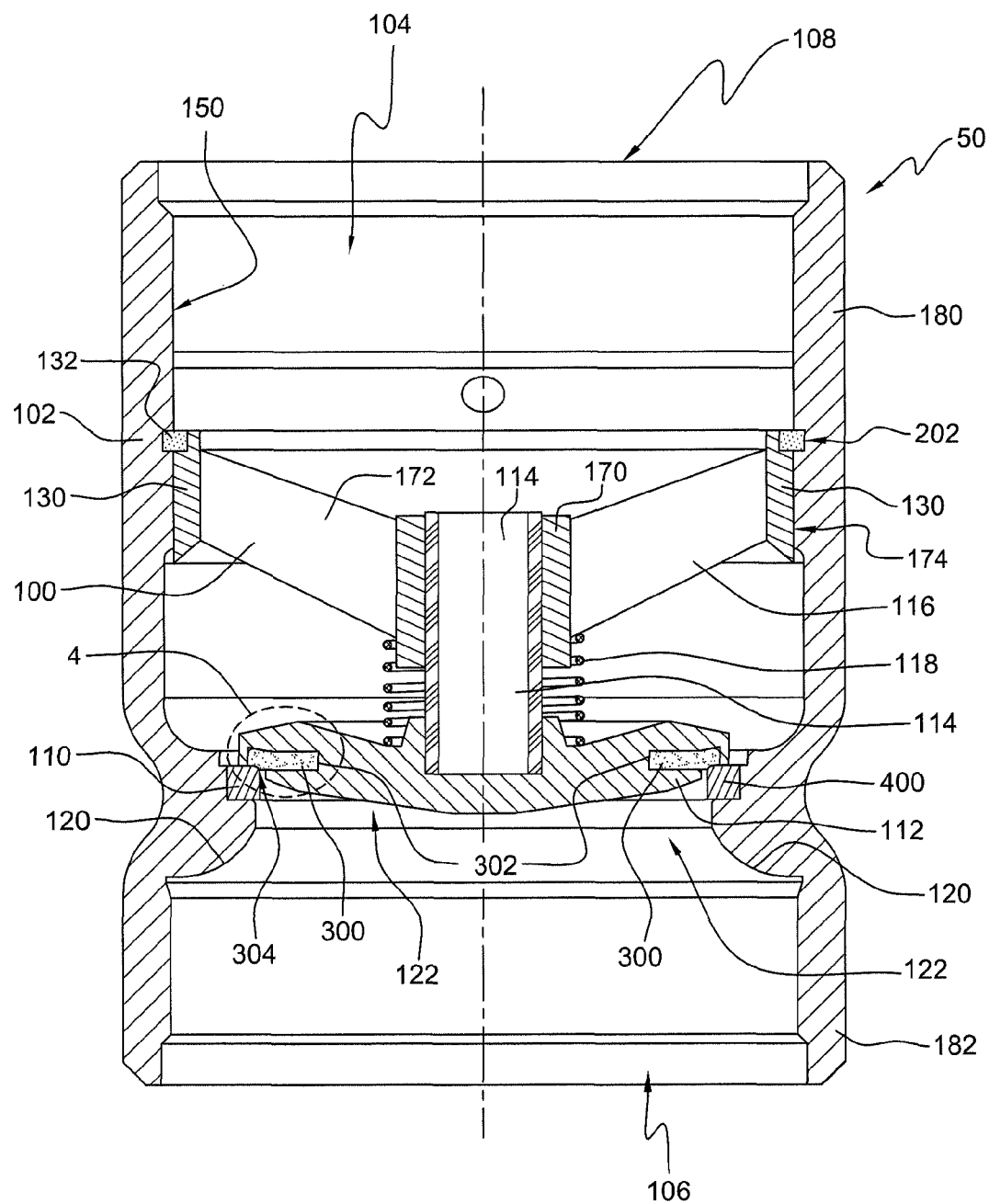
FIG. 1 depicts a longitudinal cross-sectional view through a check valve constructed in accordance with the principles of the present invention, and illustrating the valve in a closed position.

For the purposes of promoting an understanding of the principles of a valve designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the check valve invention relates.

Presented herein is an improved valve capable of handling variable fluid flow in either a vertical or horizontal direction. In traditional applications of fluid control valves, the rate of fluid flow was either very high or very low. Thus, a valve disk would always need to be positioned either in the maximum open position or the maximum closed position to operate properly. However, more recently, variable frequency drives have been used to power pumps, resulting in a variable rate of fluid flow. The variable rate of fluid flow may cause a valve to be disposed at a distance between the maximum open position and the closed position. However, traditional valves do not function properly when used in connection with these variable frequency drive pumps because the pressure exerted against the valve disk is insufficient to displace it to the maximum open position.

Conventional check valves include a valve disk in a downstream portion of a valve connected to a stem extending through a valve aperture and into an upstream portion of the valve. These check valves also include a rubber disk that cooperates with a valve seat forming the valve aperture. The rubber disk seals with the valve seat to prevent leakage of fluid when the valve is in the closed position. This rubber seal is positioned between a valve disk and a valve stem and held tightly by a fastener connecting the valve disk to the valve stem. An example of a valve having this configuration is described in more detail in U.S. Pat. No. 6,581,633 to Andersson, which is hereby incorporated herein by reference. However, assembly and/or repair of these valves are difficult because the valve disk and the valve stem are located on opposite sides of the valve seat or flange formed within the valves.

In the illustrative embodiment shown in FIG. 1, a valve 50 includes a tubular casing or housing 102 containing a poppet valve 100 designed and constructed in accordance with one or more aspects of the present invention. Housing 102 defines a passage 104 having an inlet port 106 and an outlet port 108. Valve 50 includes an upstream portion 182, generally between inlet port 106 and poppet valve 100, and a downstream portion 180, generally between outlet port 108 and poppet valve 100. Fluid enters inlet port 106, which is upstream from poppet valve 100 and flows towards outlet port 108, which is downstream from poppet valve 100. Within tubular housing 102, an inwardly extending circumferential flange 120 protruding from an inner surface 150 of the housing forms a valve aperture 122. Typically, flange 120 is circular in shape as defined by its inner surface forming valve aperture 122. However, valve aperture 122 is not limited to any particular geometrical shape. A valve seat 110 may be generally circular in shape and is formed by flange 120.

In one embodiment, poppet valve 100 is moveably mounted within housing 102 in passage 104 between flange 120 and outlet port 108. Poppet valve 100 includes a valve disk 112 and a valve stem 114 extending into downstream portion 180 of tubular housing 102. The edge of the base of valve disk 112 is annular, having a diameter greater than the diameter of valve seat 110.

Figure 3:
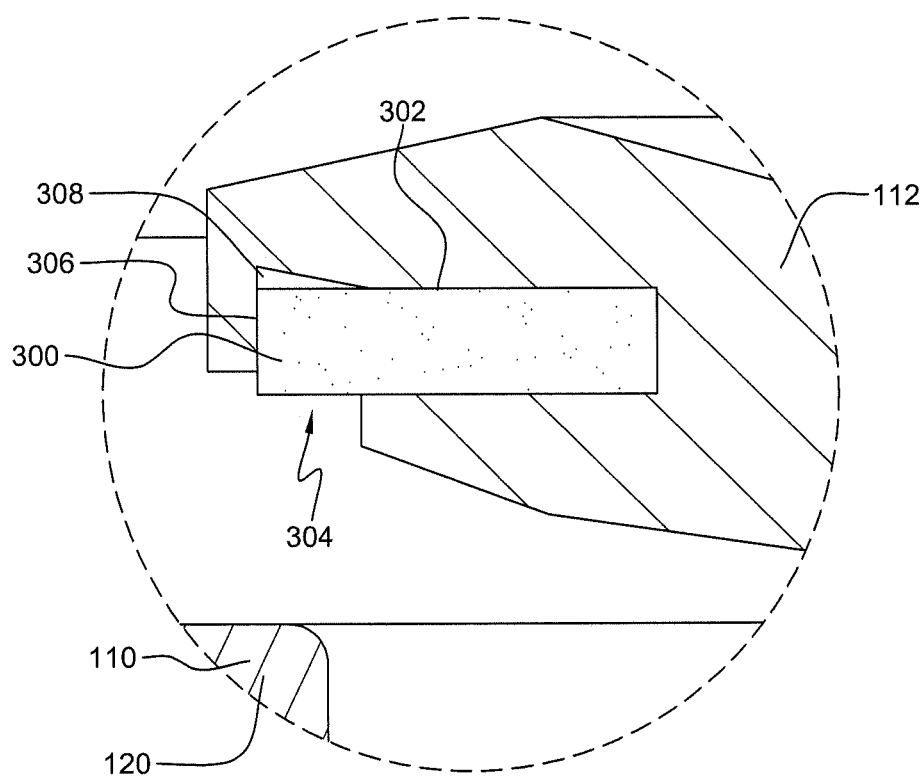
FIG. 3, depicts a detailed view of the valve disk and flange of the check valve of FIG. 1, where the valve disk is in an open position, in accordance with the principles of the present invention.
Figure 4:
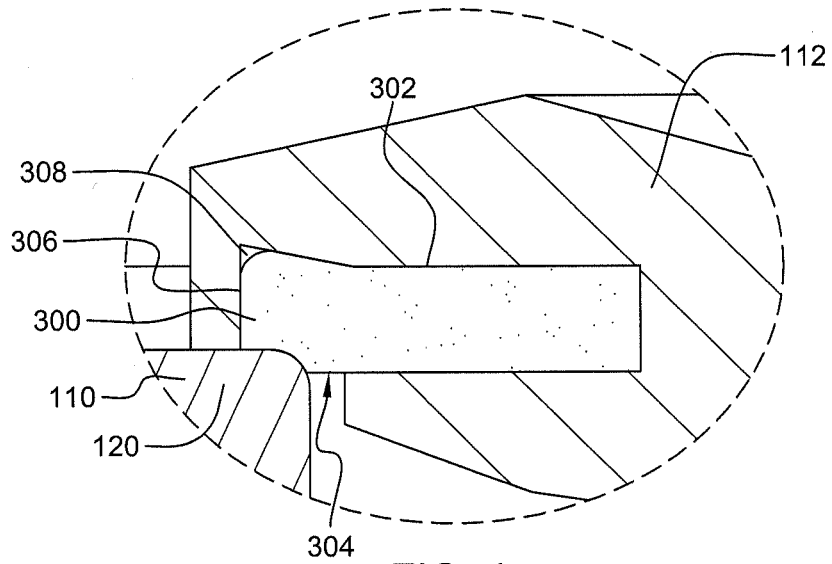
FIG. 4, depicts a detailed view of the valve disk and flange of the check valve of FIG. 1, where the valve disk is in a closed position, in accordance with the principles of the present invention.

Shown in detail in FIGS. 3 and 4 of an illustrative embodiment, valve disk 112 includes an annular cavity or chamber 302 adapted to receive and contain a rubber disk 300. Contrary to conventional poppet valves, rubber disk 300 is not positioned between valve disk 112 and stem 114. Chamber 302 is formed entirely within valve disk 112 making assembly of valve 50 easier by eliminating, for example, the need for screws and other fixation devices to retain the rubber disk. Rubber disk 300 can be installed into chamber 302 of valve disk 112 prior to insertion into passage 104.

When poppet valve 100 is in a closed position, a portion of rubber disk 300 exposed through opening 304 contacts valve seat 110 just inside the outer periphery of flange 120 to mechanically and positively stop the progress of valve disk 112. In one embodiment, annular chamber 302 is defined by four sides with opening 304 adapted to receive rubber disk 300. Side 306 of annular chamber 302 assists in preventing rubber disk 300 from being blown out radially as rubber disk 300 comes into contact with valve seat 110. Side 308 of annular chamber 302 extends upwardly into valve disk 112 to further assist in preventing rubber disk 300 from being blown out as rubber disk 300 comes into contact with valve seat 110.

Referring now to FIG. 4, valve disk 112 is shown in a closed position, and is engaging valve seat 110 of flange 120. More specifically, rubber disk 300 is in contact with flange 120, and a water-tight seal is formed. Fluid cannot pass beyond valve disk 112 when rubber disk 300 is in contact with flange 120. As the force exerted by water pressure on valve disk 112 overcomes the force exerted by a spring 118, shown in FIG. 1, valve disk 112 is displaced towards outlet port 108, shown in FIG. 1, and rubber seal 300 disengages from valve seat 110 of flange 120

As shown in FIG. 4, rubber disk 300 is slightly deformed by the pressure exerted by spring 118 that holds valve disk 112 in the closed position. Rubber disk 300 is displaced into chamber 302. In traditional check valves which include a rubber disk, blow out of the seal would occur where the seal would extend beyond the edge of the valve disk. The continual use and blowout of the seal would degrade over time, and eventually unintended leakage could occur, or the rubber disk could need replacing. A check valve constructed in accordance with the principles of the present invention does not blow-out because rubber disk 300 is deformed into chamber 302. The wear on rubber disk 300 is thereby reduced, in turn reducing the chance of leakage and the need for replacement.

Figure 2:
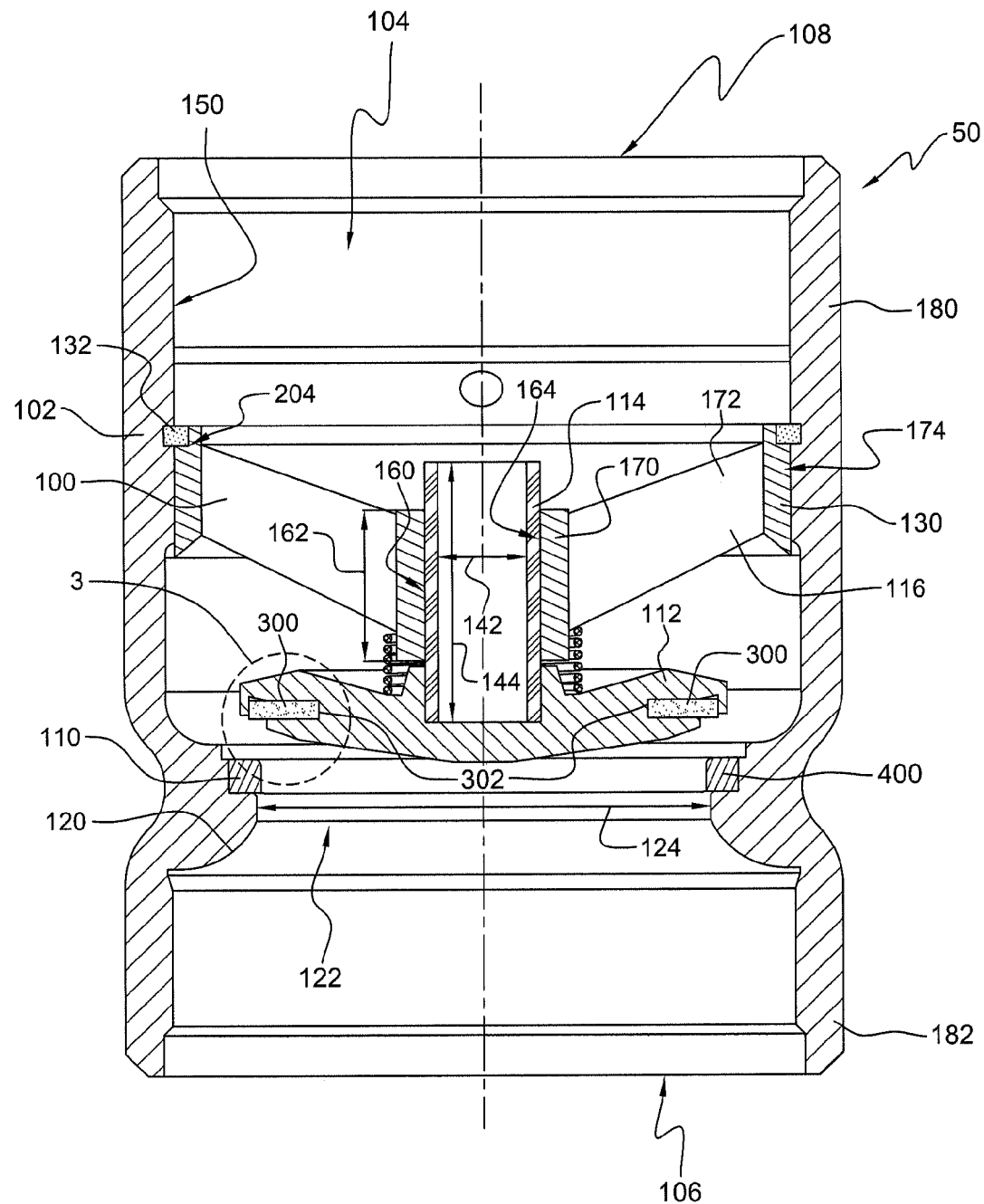
FIG. 2, depicts a longitudinal cross-sectional view through a check valve constructed in accordance with the principles of the present invention, and illustrating the valve in an open position.

Referring now to the illustrative embodiment shown in FIGS. 1 and 2, valve stem 114 of poppet valve 100 extends from valve disk 112 into the downstream portion 180 of housing 102 of valve 50. Contrary to conventional check valves, valve stem 114 extends away from valve seat 110 and does not extend through valve aperture 122. In one embodiment, stem 114 is telescopically received by a guide 116. In an alternative embodiment, guide 116 is telescopically received by valve stem 114. Guide 116 aids in guiding the reciprocating movement of poppet valve 100 within housing 102 during opening and closing of valve 50. As valve disk 112 moves towards and away from valve seat 110, stem 114 cooperates with guide 116 to maintain valve disk 112 substantially in alignment with the valve seat 110.

Referring now to the illustrative embodiment shown in FIG. 2, valve stem 114 is hollow. A hollow valve stem 114 reduces the overall weight of poppet valve 100 to allow valve disk 112 open and close more rapidly than conventional check valves. Valve disk 112 and/or valve stem 114 may also be constructed out of stainless steel, aluminum or other lightweight metal or alloy, to reduce the weight of poppet valve 100. The reduced weight of valve disk 112 and valve stem 114 results in a reduced moment of inertia and faster closing times for valve disk 112 as compared to conventional check valve designs. Faster opening and closing of valve disk 112 also results in higher flow capabilities as compared to headloss and less hydraulic shock causing water hammer.

In one embodiment, the diameter of valve stem 114 is increased in relation to the diameter of valve aperture 122. Valve stem 114 has a diameter 142. Valve aperture 122 has a valve aperture diameter 124. By increasing the valve stem diameter 142, the overall stability of poppet valve 100 may improve. In one embodiment, valve stem diameter 142 is approximately equal to the distance the valve disk 122 travels from a fully open position to a fully closed position. In an alternative embodiment, the valve stem diameter 142 may be twenty-five percent of valve aperture diameter 124. In still another embodiment, valve stem diameter 142 may be thirty-five percent of the valve aperture diameter 124. The increased stem diameter 142 in relation to the aperture diameter 124 results in increased stability of valve disk 112 as it is displaced from an open position to a closed position and vice-versa.

The stability of poppet valve 100 may also be increased by increasing the total length and/or area of the stem 114 about which guide 116 is disposed. In one embodiment, shaft 114 includes a length 144 and surface 160. Guide 116 has a surface 164 disposed about shaft 114, surface 164 has a length 162. In one embodiment, length 162 is at least thirty-five percent of length 144, therefore guide 116 is disposed about at least thirty-five percent of the area of shaft 114. In another embodiment, length 162 is at least fifty percent of length 144, therefore guide 116 is disposed about at least fifty percent of the area of shaft 114. In still another embodiment, length 162 is at least sixty-five percent of length 144, therefore guide 116 is disposed about at least sixty-five percent of the area of shaft 114. In embodiments where guide 116 is disposed about a greater percentage of shaft 114, the stability of valve disk 112 is increased. Thus, greater guiding surface leads to a generally more stable valve disk.

In the illustrative example shown in FIG. 1, guide 116 includes a sleeve 170 for telescopically receiving stem 114 during opening and closing of valve 50. Guide 116 also includes support arms 172 that extend radially from sleeve 170 towards inner surface 150 of housing 102. Support arms 172 include an outer peripheral surface 174 facing inner surface 150 of housing 102.

Still referring to FIG. 1, in one embodiment, guide 116 is removeably mounted to inner surface 150 of housing 102 in downstream portion 180 of valve 50. Guide 116 may be secured or locked in place in downstream portion 180 of valve 50 by, for example, a guide ring 132 positioned on or in inner surface 150 of housing 102. In one embodiment, an annular channel 202 is formed about the inner surface 150 of housing 102 for receiving, for example, a guide ring 132. Guide ring 132 may be attached to, for example, outer peripheral surfaces 174 of support arms 172 of guide 116, and/or inner surface 150 of housing 102. Alternatively, guide ring 132 may be positioned between inner surface 150 of housing 102 and outer peripheral surfaces 174 of support arms 172 to prevent movement of guide 116 in passage 104. In other embodiments, guide ring 132 may be integral with and/or protrude from either inner surface 150 of housing 102 or outer peripheral surfaces 174 of support arms 172. Referring to FIG. 2, in an embodiment with guide ring 132 protruding from inner surface 150 of housing 102, an annular groove 204 may be formed and configured in outer peripheral surfaces 174 of support arms 172 to prevent guide 116 from moving within passage 104.

In one embodiment, guide 116 is inserted into housing 102 through outlet port 108, until ring 132 affixed to outer peripheral surfaces 174 of support arms 172 mates with annular channel 202 formed in inner surface 150 of housing 102, thereby securing guide 116 in place such that it may not be displaced by water pressure exerted against valve disk 112. In an alternative embodiment, guide 116 is inserted into housing until ring 132, attached to inner surface 150 of housing 102 mates with an annular groove 204 formed in outer peripheral surfaces 174 of support arms 172. In yet another embodiment, ring 132 may be separately inserted into housing 102 after guide 116 has been inserted into housing 102. In an alternative embodiment, ring 132 may be inserted into housing 102 before guide 116, and guide 116 advanced over ring 132 and then secured in place. Further, the placement and repair of all the elements of poppet assembly 110 can be achieved with simple hand tools. In each of the embodiments discussed above, ring 132 may be compressed before it is placed in passage 104. Ring 132 may expand once it reaches annular chamber 202. After ring 132 expands, it may secure or lock guide 116 in place.

Once support arms 172 are secured or locked into place, guide 116 is prevented from sliding or otherwise moving within housing 102 until guide ring 132 is removed. By removably mounting guide 116 within the downstream portion of housing 102, assembly of valve 50 and/or replacement or repair of poppet valve 100 is easier and quicker. In alternative embodiments, guide 116 may be permanently affixed to inner surface 150 of housing 102. Unlike conventional poppet valves that need to be fully open for proper support, guide 116 provides support to poppet valve 100 throughout the opening and closing of valve 50, even when valve 50 is only partially open. Also, a valve constructed in accordance with one or more principles of the present invention does not rely on a stem having guide legs extending through a valve aperture for stability and proper operation of the valve. Without use of such guide legs, poppet valve 100 does not become lodged in or with the interior seat.

In alternative embodiments, guide 116 may be removeably mounted to inner surface 150 of housing 102 in other ways, including, for example, without the use of a guide ring 132 or by using other means not illustrated such as, for example, using other fasteners, such as, for example, screws, rivets or the like, heat shrinking, shrink fitting, press fitting, snap fitting and the like. In one embodiment, the outer peripheral surface 174 of support arms 172 may mate with an annular groove 202 in inner surface 150 of housing 102 without the use of a guide ring.

Still referring to the illustrative embodiments of FIGS. 1 and 2, an elastomeric spring means such as, for example, a stainless steel coil spring 118, biases valve disk 112 in the closed position against valve seat 110. Spring 118 is telescoped over the outer diameter of valve stem 114. A first end of spring 118 is supported or, alternatively, anchored against guide 116. Opposite end of spring 118 is supported or, alternatively, anchored against valve disk 112. In each of the embodiments listed above, the diameter of spring 118 is larger than the stem diameter 142. A spring 118 having a larger diameter spreads the force of the spring about a large area of valve disk 112, resulting in a more stable resistance to the pressure of fluid against valve disk 112. Thus, a larger diameter of spring 118 results in a more stable in poppet valve 110 operation.

As shown in FIG. 2, valve 50 operates in the usual manner of a check valve to provide an opening in the valve when the pressure in upstream portion 182 of valve housing 102 is sufficient to overcome the force imposed on valve disk 112 by spring means and to be closed by action of spring means when the pressure upstream of the valve is decreased.

In traditional valves, the poppet valve must be positioned in a vertical position, such that an outlet port is directly above and in line with an inlet port, such that the flow of water is against the pull of gravity. However, a valve constructed in accordance with the principles of the present invention may be placed in alternative positions. For example, poppet valve 100 may be placed in a horizontal position where inlet port 106 and outlet port 108 lie at the same relative altitude rather than outlet port 108 being positioned above inlet port 106, such that the flow of water is normal to the pull of gravity. In another example inlet port 106 may be positioned above outlet port 108, such that the flow of water is in the same direction as the pull of gravity. A check valve constructed in accordance with the principles of the present invention may be installed in substantially any direction, permitting fluid flow in substantially any direction. The increased stem diameter 142 and length 162 of surface 160 of guide 116 result in a more stable poppet assembly 110, resulting in a check valve 100 that may be placed in alternative positions.

Current check valve designs are compromised due to a lack of stability when they are not in a fully open or fully closed position. This lack of stability in partially open positions compromises the utility of these valves in connection with pumps that employ variable frequency drives. Pumps with variable frequency drives are capable of generating varying rates of fluid flow. At times, the variable fluid flow may be capable of overcoming the force of spring required to keep the valve disk in contact with flange, but insufficient to displace valve disk to a fully open position. In traditional check valves, when a valve disk is displaced from a flange but not in a fully open position, the flow of fluid may cause the valve disk to become misaligned.

In accordance with an aspect of the invention, valve 50 is capable of preventing misalignment and instability of valve disk 112. In accordance with the principles of the present invention, as stem diameter 142 increases relative to aperture diameter 124, the stability of poppet valve 100 increases. Thus, embodiments where stem diameter 142 is at least thirty-five percent of aperture diameter 124 are more stable than embodiments where stem diameter 142 is at least twenty-five percent of aperture diameter 124. The preferred stability can be achieved where the stem diameter 142 is substantially equal to the distance the valve disk 112 travels from a fully open position to a fully closed position. Similarly, embodiments where guide 116 is disposed about a greater portion of valve stem 114 are more stable than embodiments where guide 116 is disposed about a lesser portion of valve stem 114. Thus, embodiments where guide 116 is disposed about at least sixty-five percent of length 144 are more stable than embodiments where guide 116 is disposed about at least fifty percent of length 144, which are more stable than embodiments where guide 116 is disposed about at least thirty-five percent of length 144. In accordance with various aspects of the invention, stem diameter 142 and the area of stem 114 guide 116 is disposed about may vary in order to achieve the amount of desired stability of poppet valve 110 such that other characteristics of check valve 100 are not compromised.

In an alternative embodiments, valve 50 may include a replaceable seat 400 disposed on flange 120. Seat 400 may be permanently or removably affixed to flange 120. In one embodiment, seat 400 may be disposed within housing 102 and adjacent flange 120 before poppet assembly 110 is disposed within housing 102 as described above. Replaceable seat 400 may be removed and alternative seat 400 may be placed within housing 102. Seat 400 may be made, for example, of a material different than material of housing 102 or flange 120. For example, in one embodiment, seat 400 can be made of rubber.

While embodiments of the invention have been illustrated and described in detail in the disclosure, the disclosure is to be considered as illustrative and not restrictive in character. All changes and modifications that come within the spirit of the invention are to be considered within the scope of the disclosure.

The invention claimed is:

1. A valve, said valve comprising:
   a housing including an inner periphery surface defining a passage therethrough;
   a flange within said housing dividing the passage into an upstream portion and a downstream portion, said flange defining a valve seat and having an inner surface defining a valve aperture;
   a poppet valve positioned in the downstream portion of the passage of said housing, said poppet valve including a valve disk and a valve stem extending from the valve disk towards the downstream portion of the passage, the valve disk engaging the valve seat of said flange and moveable between a fully closed position to a fully open position, the valve disk being resiliently biased in the fully closed position against the valve seat by a resilient member to inhibit fluid flow between the upstream and downstream portions of the housing; and
   a guide, said guide comprising a sleeve engaging the valve stem of said poppet valve as said valve disk moves between the fully closed position and the fully open position, said guide further comprising support arms extending radially from the sleeve, the support arms mounted to the inner periphery surface of said housing,
   wherein the valve disk forms a chamber having an opening for receiving and retaining a seal and a recessed side substantially opposing the opening, a portion of the seal exposed by the opening of the chamber contacts the valve seat when said poppet valve is in the fully closed position,
   wherein the resilient member is pre-loaded to an extent such that the valve disk is normally resiliently biased into the fully closed position with an outer peripheral portion of the seal deformed into the chamber in a first direction extending toward the valve stem and into abutment with the recessed side of the chamber via contact with a portion of the valve seat adjacent the inner surface of the flange that defines the valve aperture,
   wherein a first side of the chamber extends about an outer periphery surface of the outer peripheral portion of the seal that at least generally faces away from the valve stem and toward the inner periphery surface of the housing to prevent the seal from expanding radially outward toward the inner periphery surface of said housing when said valve disk is resiliently biased in the fully closed position, and
   wherein, in the fully closed position of the valve disk, the portion of the valve disk forming the first side of the chamber engages the valve seat of the flange to close off the seal and the chamber from the downstream portion of the housing.

2. The valve of claim 1, wherein the valve stem does not pass through the valve aperture defined by the flange.

3. The valve of claim 1, wherein said guide is removeably mounted to the inner periphery surface of said housing by a guide ring, the guide ring prevents said guide from moving within the passage.

4. The valve of claim 3, wherein the guide ring is affixed to said guide, said housing including an annular groove, the annular groove receiving the guide ring and preventing movement of the guide in the passage.

5. The valve of claim 3, wherein the guide ring is affixed to the inner periphery surface of said housing, said guide including an annular groove, the annular groove receiving the guide ring and preventing movement of the guide in the passage.

6. The valve of claim 1, wherein the valve seat includes a removable rubber disk, wherein the portion of the valve disk forming the seqend first side of the chamber contacts the removable rubber disk in the fully closed position.

7. The valve of claim 1, wherein the valve stem has a diameter, the valve stem diameter being substantially equal to the distance the valve disk travels from a fully open position to the fully closed position.

8. The valve of claim 7, wherein the valve aperture has a diameter, and the valve stem diameter being at least 25% of the diameter of the valve aperture.

9. The valve of claim 1, wherein the sleeve of said guide telescopically receives the valve stem.

10. The valve of claim 1, wherein the support arms of said guide are removeably mounted to the inner periphery surface of said housing.

11. The valve of claim 1, wherein the first direction extends at least generally along a direction extending from the upstream portion to the downstream portion of the passage of the housing.

12. The valve of claim 1, wherein the first side of the chamber is immediately adjacent the recessed side of the chamber.

13. The valve of claim 1, wherein the deformed outer peripheral portion of the seal in the fully closed position of the valve disk is immediately adjacent the outer periphery surface thereof.

14. The valve of claim 1, wherein the valve seat of the flange is a substantially planar annular surface oriented substantially perpendicular to the direction of movement of the valve disk between the fully closed position and the fully open position.

15. The valve of claim 1, wherein the first side of the chamber abuts the outer periphery surface of the seal.

16. The valve of claim 1, wherein an annular space is formed between the recessed side of the chamber and the seal when the valve disk is in a position other than the fully closed position, and wherein, in the fully closed position of the valve disk, the resilient member deforms the seal via the valve seat in abutment with the recessed side of the chamber such that the annular space is eliminated.

17. The valve of claim 1, wherein the chamber is formed entirely within the valve disk, and wherein the valve disk is of one-piece construction.

18. The valve of claim 1, wherein the portion of the recessed side of the chamber that is proximate to the first side of the chamber is positioned further from the valve seat as compared to the other portions of the recessed side of the chamber.

19. The valve of claim 1, wherein the recessed side of the chamber extends in the direction of the movement valve disk from the fully closed position to the fully open position as it extends from an inner portion of the chamber to the first side of the chamber such that the size of the chamber between the opening and the recessed side proximate to the first side is greater than the size of the chamber at a medial portion of the recessed side.

20. The valve of claim 1, wherein the portion of the valve seat adjacent the inner surface of the flange that contacts the outer peripheral portion of the seal in the fully closed position of the valve disk is spaced from an inner edge of the opening of the chamber of the valve disk when the valve disk is in the fully closed position such that a portion of the seal extending between the inner surface of the flange and the inner edge of the opening of the chamber is exposed to the upstream portion of the passage of the housing when the valve disk is in the fully closed position.

* * * * *